US012272300B2

(12) United States Patent
Lim et al.

(10) Patent No.: US 12,272,300 B2
(45) Date of Patent: *Apr. 8, 2025

(54) DISPLAY DEVICE AND DRIVING METHOD OF THE SAME

(71) Applicant: LG Display Co., Ltd., Seoul (KR)

(72) Inventors: HyunKyo Lim, Paju-si (KR); Dongsup Sim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,892

(22) Filed: Nov. 13, 2023

(65) Prior Publication Data

US 2024/0087506 A1 Mar. 14, 2024

Related U.S. Application Data

(63) Continuation of application No. 17/959,870, filed on Oct. 4, 2022, now Pat. No. 11,837,159.

(30) Foreign Application Priority Data

Oct. 13, 2021 (KR) ........................ 10-2021-0135908

(51) Int. Cl.
*G09G 3/3275* (2016.01)
*G09G 3/32* (2016.01)

(52) U.S. Cl.
CPC ....... *G09G 3/32* (2013.01); *G09G 2300/0842* (2013.01); *G09G 2310/0275* (2013.01); *G09G 2330/021* (2013.01); *G09G 2330/028* (2013.01)

(58) Field of Classification Search
CPC ............. G09G 3/32; G09G 2300/0842; G09G 2310/0275; G09G 2330/021; G09G 2330/028; G09G 3/3258; G09G 3/36
(Continued)

(56) References Cited

U.S. PATENT DOCUMENTS

2016/0104408 A1* 4/2016 Kim ......................... G09G 3/36
345/690
2021/0035505 A1* 2/2021 Kwon .................. G09G 3/3258

FOREIGN PATENT DOCUMENTS

CN 109545149 A 3/2019
CN 110033736 A 7/2019
(Continued)

OTHER PUBLICATIONS

U.S. Appl. No. 17/959,870 filed Oct. 4, 2022.
(Continued)

*Primary Examiner* — Abdul-Samad A Adediran
(74) *Attorney, Agent, or Firm* — Birch, Stewart, Kolasch & Birch, LLP

(57) ABSTRACT

A display device can operate in a first mode for displaying at least a first image including first frames based on a first driving frequency, or in a second mode for displaying a second image including second frames based on a second driving frequency different from the first driving frequency. Further, when the first image displayed on the display panel operating in the first mode is changed to a third image, at least one frame among third frames running after the first image has been displayed among the plurality of frames displaying the third image operates at the second driving frequency based on the second mode. Also, in the first mode, the second image includes reset frames for periodically resetting a voltage of an anode electrode between refresh frames for supplying at least one data signal to at least one of the plurality of pixels for a preset time.

20 Claims, 14 Drawing Sheets

(58) Field of Classification Search
USPC .......................................................... 345/690
See application file for complete search history.

(56) References Cited

FOREIGN PATENT DOCUMENTS

| | | |
|---|---|---|
| KR | 10-2020-0057204 A | 5/2020 |
| KR | 10-2021-0016123 A | 2/2021 |

OTHER PUBLICATIONS

Korean Office Action for Korean Application No. 10-2021-0135908, dated Dec. 18, 2024.
Chinese Office Action for Chinese Application No. 202211199595.9, dated Dec. 19, 2024.

* cited by examiner

DISPLAY DEVICE AND DRIVING METHOD OF THE SAME

CROSS-REFERENCE TO RELATED APPLICATION

This application is a Continuation Application of U.S. application Ser. No. 17/959,870, filed on Oct. 4, 2022, which claims priority to Korean Patent Application No. 10-2021-0135908, filed on Oct. 13, 2021, in the Republic of Korea, where the entire contents of all these applications are hereby expressly incorporated by reference into the present application.

BACKGROUND

Field of the Disclosure

The present disclosure relates to display devices and methods of driving a display device, and more specifically, to a display device capable of reducing power consumption and improving the quality of images displayed, and a method of driving the display device.

Description of the Background Art

As the information society has developed at a rapid rate, there is an increasing need for display devices employing advanced technologies and more efficient methods. Recently, various types of display devices, such as a liquid crystal display (LCD) device, a quantum dot light emitting display (QLED) display, an organic light emitting display (OLED) device, or the like, have been developed and utilized.

In general, a display device can display images by sequentially driving a plurality of frames for a preset time. Further, when the display device displays images such as photos, games, and videos, etc., the greater the number of frames displayed for a preset time is, that is, the shorter the time of one frame is, the more naturally the images displayed on a display panel can be displayed.

However, if the number of frames increases, that is, the time of one frame decreases, there can arise a limitation that may cause power consumption of the display device to increase.

SUMMARY OF THE DISCLOSURE

In general, a display device can adjust the time of one frame according to images displayed in order to reduce power consumption. However, if the time of one frame is lengthened, it can be recognized that corresponding luminance may be lowered, which may result in the image quality of the display device being degraded. To address these issues, embodiments of the present disclosure provide a display device capable of reducing power consumption and preventing the degradation of image quality, and a method driving the display device.

Embodiments and examples of the present disclosure discussed below are not limited to address the above issue, and other issues not described above will become apparent to those skilled in the art from the following detailed description.

According to one aspect of the present disclosure, a display device can include a display panel that includes a plurality of data lines, a plurality of gate lines, and a plurality of pixels connected to the plurality of data lines and the plurality of gate lines, and that is configured to display an image including a plurality of frames, a data driver configure to supply data signals to the plurality of data lines, a gate driver configured to supply gate signals to the plurality of gate lines, and a timing controller configured to control the data driver and the gate driver and supply image signals to the data driver. The display panel can operate in a first mode for displaying an image including a plurality of frames based on a first driving frequency, or in a second mode for displaying the image including the plurality of frames based on a second driving frequency different from the first driving frequency. When the image displayed on the display panel operating in the first mode is changed from a first image in which the number of pixels representing a low gray level among the plurality of pixels is equal to or greater than a first threshold value to a second image in which the number of pixels representing a high gray level among the plurality of pixels is equal to or greater than a second threshold value, at least one frame running after the first image has been displayed among the plurality of frames representing the second image can operate at the second driving frequency based on the second mode.

According to another aspect of the present disclosure, a display device can include a display panel that includes a plurality of data lines, a plurality of gate lines, and a plurality of pixels connected to the plurality of data lines and the plurality of gate lines, and that is configured to display an image including a plurality of frames, a data driver configured to supply data signals to the plurality of data lines, a gate driver configured to supply gate signals to the plurality of gate lines, and a timing controller configured to control the data driver and the gate driver and supply image signals to the data driver. When the image displayed on the display panel is changed from a first image representing a low gray level to a second image representing a high gray level, the first image can be displayed based on a first driving frequency, and the second image can be displayed based on a second driving frequency different from the first driving frequency for a preset time and thereafter, can be displayed based on the first driving frequency.

According to embodiments of the present disclosure, there is provided an effect of reducing power consumption by low-frequency driving.

Further, according to embodiments of the present disclosure, there is provided an effect of preventing or reducing the degradation of the image quality of the display device by enabling a time to reach target luminance to be shortened through the changing of a driving scheme at a time when a gray level of an image displayed in the display device is changed.

Further, according to embodiments of the present disclosure, there is provided an effect of preventing or reducing the degradation of the image quality of the display device by enabling an amount of current to be changed when driven at a low frequency.

The effects of embodiments of the present disclosure are not limited to the above-mentioned effects. Further, embodiments of the present disclosure are not limited to the above description, other additional embodiments, including variations thereof, will become apparent to those skilled in the art from the following detailed description.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure. In the drawings.

DETAILED DESCRIPTION OF THE EMBODIMENTS

Figure 1:
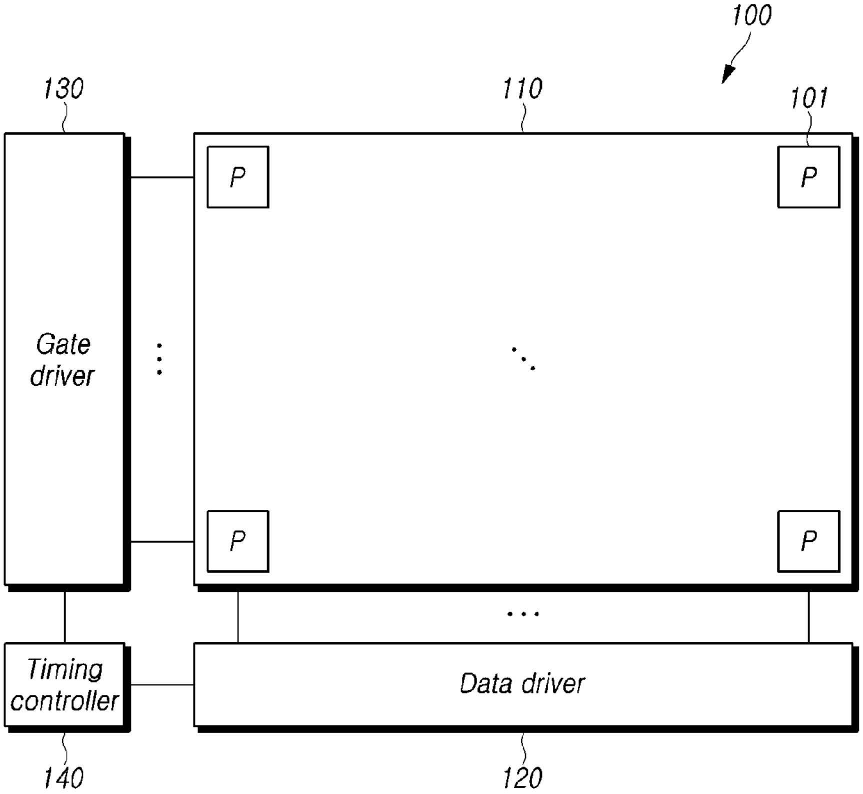
FIG. 1 illustrates a system configuration of a display device according to embodiments of the present disclosure.

The advantages and features of the present disclosure and methods of achieving the same will be apparent by referring to embodiments of the present disclosure as described below in detail in conjunction with the accompanying drawings. However, the present disclosure is not limited to the embodiments set forth below, but can be implemented in various different forms. The following embodiments are provided only to completely disclose the present disclosure and inform those skilled in the art of the scope of the present disclosure, and the present disclosure is defined only by the scope of the appended claims.

In addition, the shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description of the present disclosure, detailed description of well-known functions and configurations incorporated herein will be omitted when it is determined that the description can make the subject matter in some embodiments of the present disclosure rather unclear. The terms such as "including", "having", "containing", "comprising of", and "consist of" used herein are generally intended to allow other components to be added unless the terms are used with the term "only". Singular forms used herein are intended to include plural forms unless the context clearly indicates otherwise.

In interpreting any elements or features of the embodiments of the present disclosure, it should be considered that any dimensions and relative sizes of layers, areas and regions include a tolerance or error range even when a specific description is not conducted.

Spatially relative terms, such as" "on", "over", "above", "below", "under", "beneath", "lower", "upper", "near", "close", "adjacent", and the like, can be used herein to describe one element or feature's relationship to another element(s) or feature(s) as illustrated in the figures, and it should be interpreted that one or more elements can be further "interposed" between the elements unless the terms such as "directly", "only", and the like are used.

Time relative terms, such as "after", "subsequent to", "next to", "before", or the like, used herein to describe a temporal relationship between events, operations, or the like are generally intended to include events, situations, cases, operations, or the like that do not occur consecutively unless the terms such as "directly", "immediately", and the like are used.

When embodiments related to signal flows are discussed, for example, an embodiment where a signal is transmitted from node A to node B can include the transmission of the signal from node A to node B by way of another node unless the terms such as "directly", "immediately", and the like are used.

When the terms, such as "first", "second", or the like, are used herein to describe various elements or components, it should be considered that these elements or components are not limited thereto and may not define order. These terms are merely used herein for distinguishing an element from other elements. Therefore, a first element mentioned below can be a second element in a technical concept of the present disclosure.

The elements or features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

A display device according to embodiments of the present disclosure includes: a display panel that includes a plurality of data lines, a plurality of gate lines, and a plurality of pixels connected to the plurality of data lines and the plurality of gate lines, and that is configured to display an image including a plurality of frames, a data driver configured to supply data signals to the plurality of data lines, a gate driver configured to supply gate signals to the plurality of gate lines, and a timing controller configured to control the data driver and the gate driver and supply image signals to the data driver. The display panel can operate in a first mode for displaying the image including the plurality of frames based on a first driving frequency, or in a second mode for displaying the image including the plurality of frames based on a second driving frequency different from the first driving frequency. When the image displayed on the display panel operating in the first mode is changed from a first image in which the number of pixels representing a low gray level among the plurality of pixels is equal to or greater than a first threshold value to a second image in which the number of pixels representing a high gray level among the plurality of pixels is equal to or greater than a second threshold value, at least one frame running after the first image has been displayed among the plurality of frames representing the second image can operate at the second driving frequency based on the second mode.

The second driving frequency can be higher than the first driving frequency.

The timing controller can include a memory for storing image signals on a frame basis. The timing controller can add image signals included in one frame of a plurality of frames stored in the memory, and by comparing a value resulting from the adding with a preset value, determine that the number of pixels representing a low gray level among pixels included in the one frame is equal to or greater than a first threshold value or determine that the number of pixels representing a high gray level among the pixels included in the one frame is equal to or greater than a second threshold value.

Each of the plurality of pixels in the display device can include a light emitting diode including an anode electrode, a cathode electrode, and an emissive layer disposed between the anode electrode and the cathode electrode. The second image in the first mode can include reset frames for periodically resetting a voltage at the anode electrode, which are located between refresh frames for supplying at least one data signal to at least one of the plurality of pixels through at least one data line for a preset time.

Further, the second mode in the display device can include one or more refresh frames for supplying the at least one data signal to the at least one data line.

A display device according to embodiments of the present disclosure includes: a display panel that includes a plurality of data lines, a plurality of gate lines, and a plurality of pixels connected to the plurality of data lines and the plurality of gate lines, and that is configured to display an image including a plurality of frames, a data driver configured to supply data signals to the plurality of data lines, a gate driver configured to supply gate signals to the plurality of gate lines, and a timing controller configured to control the data driver and the gate driver and supply image signals to the data driver. When the image displayed on the display panel is changed from a first image representing a low gray level to a second image representing a high gray level, the first image can be displayed based on a first driving frequency, and the second image can be displayed based on a second driving frequency higher than the first driving frequency for a preset time and thereafter displayed based on the first driving frequency.

The data driver, the gate driver, and the timing controller can operate at the first driving frequency or the second driving frequency for the first image and/or the second image.

The timing controller can include a memory. The timing controller can determine whether the image displayed on the display panel corresponds to the first image or the second image based on a value obtained by adding image signals included in one frame of a plurality of frames stored in the memory.

Each of the plurality of pixels can include a light emitting diode including an anode electrode, a cathode electrode, and an emissive layer disposed between the anode electrode and the cathode electrode. Some of a plurality of frames included in the second image can include refresh frames for supplying at least one data signal to at least one of the plurality of pixels through at least one data line, and one or more reset frames for periodically resetting a voltage at the anode electrode, which are located between the refresh frames, and the others of the plurality of frames included in the second image can include one or more refresh frames for supplying the at least one data signal to the at least one data line.

Some of the plurality of frames included in the second image can be displayed on the display panel based on the second driving frequency, and the others of the plurality of frames included in the second image can be displayed on the display panel based on the first driving frequency.

The plurality of frames included in the first image can be displayed on the display panel based on the first driving frequency.

The second driving frequency can be higher than the first driving frequency.

A method of driving the display device according to embodiments of the present disclosure can include adding gray level values on a frame basis for an image including a plurality of frames, and determining whether the image corresponds to a first image representing a low gray level or a second image representing a high gray level based on a value resulting from the adding. In this case, the first image can be displayed on the display panel based on a first driving frequency, and the second image can be displayed on the display panel based on a second driving frequency higher than the first driving frequency for a preset time and thereafter displayed based on the first driving frequency.

The second driving frequency can be higher than the first driving frequency.

The display panel of the display device including a plurality of data lines, a plurality of gate lines, and a plurality of pixels can operate in a first mode and a second mode, which are distinct from each other. In this case, the second image in the first mode can be displayed on the display panel based on the second driving frequency higher than the first driving frequency for a preset time and thereafter displayed on the display panel based on the first driving frequency.

Each of the plurality of pixels can include a light emitting diode including an anode electrode, a cathode electrode, and an emissive layer disposed between the anode electrode and the cathode electrode. Some of a plurality of frames included in the second image can include refresh frames for supplying at least one data signal to at least one data line, and one or more reset frames for periodically resetting a voltage at the anode electrode, which are located between the refresh frames, and the others of the plurality of frames included in the second image can include one or more refresh frames for supplying at least one data signal to at least one data line.

Hereinafter, with reference to the accompanying drawings, various embodiments of the present disclosure will be described in detail. All the components of each display device according to all embodiments of the present disclosure are operatively coupled and configured.

FIG. 1 illustrates a system configuration of a display device according to embodiments of the present disclosure.

Referring to FIG. 1, a display device 100 includes a display panel 110, a data driver 120, a gate driver 130, a timing controller 140, and the like.

The display panel 110 can include a plurality of data lines (DL1 to DLm) extending in a first direction and a plurality of gate lines (GL1 to GLn) extending in a second direction different from the first direction. The first direction and the second direction can be orthogonal to each other. However, embodiments of the present disclosure are not limited thereto. For example, the first direction and the second direction can intersect each other at a preset angle.

Further, the display panel 110 can include a plurality of pixels 101. The plurality of pixels 101 can operate in response to data signals transmitted through the data lines and gate signals transmitted through the gate lines. The plurality of pixels 101 can be initialized in response to an initialization signal.

The display panel 110 can display an image including a plurality of frames. The display panel 110 can operate in a first mode in which an image including a plurality of frames is displayed based on a first driving frequency or in a second mode in which an image including a plurality of frames is displayed based on a second driving frequency different from the first driving frequency.

The data driver 120 can be connected to the plurality of data lines DL1 to DLm and can supply data signals to the plurality of pixels 101 through the plurality of data lines DL1 to DLm, where m can be a positive number such as a positive integer. The data driver 120 can include a plurality of source drivers. The plurality of source drivers each can be implemented in an integrated circuit.

The gate driver 130 can be connected to the plurality of gate lines (GL1 to GLn) and can supply gate signals to the plurality of gate lines GL1 to GLn, where n can be a positive number such as a positive integer. The data signals can be supplied to the pixels to which the gate signals are supplied through the gate lines.

Although FIG. 1 shows that the gate driver 130 is located outside of the display panel 110, embodiments of the present disclosure are not limited thereto. For example, the gate driver 130 can be disposed on the display panel 110. Further, the gate driver 130 can be disposed on the display panel 110 and include a gate signal generator for outputting one or more gate signals and one or more level shifters for supplying one or more voltages and one or more clocks to the gate signal generator. Further, the gate driver 130 can be implemented with a plurality of integrated circuits.

Although FIG. 1 shows that the gate driver 130 is located on one side of the display panel 110, embodiments of the present disclosure are not limited thereto. For example, gate drivers 130 can be disposed in two sides of display panel 110, such as left and right sides, top and bottom sides, or the like. Also, the gate driver disposed on the left side of the display panel 110 can be connected to the odd-numbered gate lines, and the gate driver disposed on the right side thereof can be connected to the even-numbered gate lines.

The timing controller 140 can control the data driver 120 and the gate driver 130. The timing controller 140 can supply a data control signal to the data driver 120 and a gate control signal to the gate driver 130. The data control signal and the gate control signal can include a clock, a vertical synchronization signal, a horizontal synchronization signal, and a start pulse etc. However, signals provided from the timing controller 140 according to embodiments of the present disclosure are not limited thereto.

Further, the timing controller 140 can supply image signals to the data driver 120. The data driver 120 can generate data signals using the image signals and one or more data control signals received from the timing controller 140, and provide the data signals to the plurality of data lines.

The timing controller 140 can cause the display device 110 to operate in a first mode or a second mode. The first mode can be a mode in which the display device 100 is driven to consume low power, and the second mode can be a normal mode in which the display device 100 generally operates. The display device 100 can consume less power in the second mode compared with when being driven in the first mode. In the first mode, a still image or moving image can be displayed on a portion of the display panel 110 such as a portion of the display area of the display panel 110, and in the second mode, a still image or moving image can be displayed on the whole of the display panel 110 such as all of the display area. However, embodiments of the present disclosure are not limited thereto.

The display device 100 can operate in the first mode or the second mode, or can be changed from the first mode to the second mode or can be changed from the second mode to the first mode. In the first mode, the display device 100 can operate based on the first driving frequency, and in the second mode, the display device 100 can operate based on the second driving frequency. The second driving frequency can be higher than the first driving frequency.

The data driver 120, the gate driver 130, and the timing controller 140 can operate based on the first driving frequency in the first mode and operate based on the second driving frequency in the second mode.

An image displayed on the display panel 110 can include a first image in which the number of pixels representing a relatively low gray level among the plurality of pixels is equal to or greater than a first threshold value, and a second image in which the number of pixels representing a relatively high gray level among the plurality of pixels is equal to or greater than a second threshold value. Further, when the display panel 110 operates in the first mode, if an image displayed on the display panel 110 is changed from the first image to the second image, at least one frame running after the first image has been displayed among a plurality of frames representing the second image can operate at the second driving frequency corresponding to the second mode.

Further, when the image displayed on the display panel 110 is changed from the first image representing a relatively low gray level to the second image representing a relatively high gray level, the first image can be displayed based on the first driving frequency, and the second image can be displayed based on the second driving frequency higher than the first driving frequency for a preset time and thereafter displayed based on the first driving frequency.

Figure 2A:
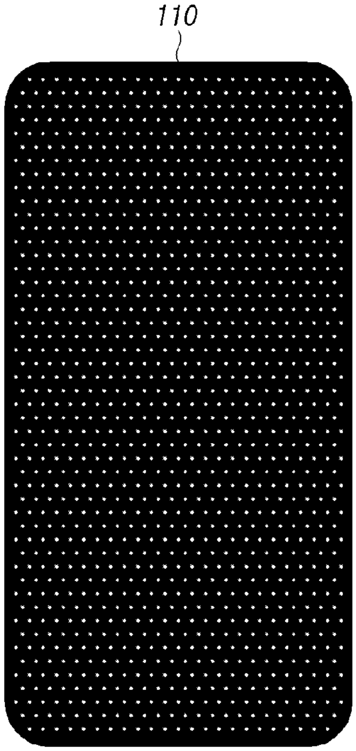
FIGS. 2A and 2B illustrate a first image and a second image displayed in the display device according to embodiments of the present disclosure.
Figure 2B:
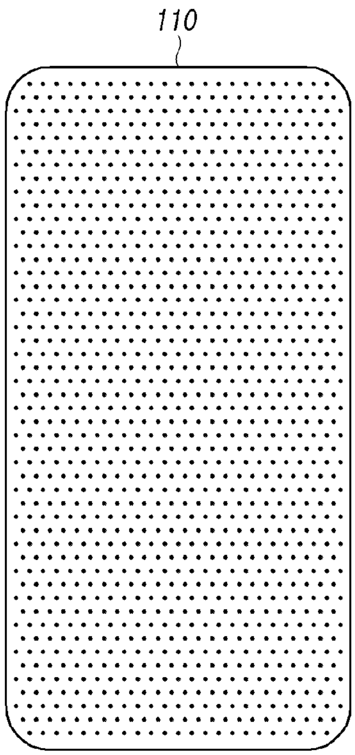

FIGS. 2A and 2B illustrate the first image and the second image displayed in the display device according to embodiments of the present disclosure.

FIG. 2A shows that the first image is displayed on the display panel 110, and FIG. 2B shows that the second image is displayed on the display panel 110.

The first image refers to an image displayed on the display panel 110 in a situation where the number of pixels representing a relatively low gray level among the plurality of pixels included in the display panel 110 is equal to or greater than a first threshold value, and the second image refers to an image displayed on the display panel 110 in a situation where the number of pixels representing a relatively high gray level among the plurality of pixels included in the display panel 110 is equal to or greater than a second threshold value.

Among the plurality of pixels of the display panel 110 that display the first image, the number of pixels representing a relatively low gray level is greater than the number of pixels representing a relatively high gray level, and among the plurality of pixels of the display panel 110 that display the second image, the number of pixels representing a relatively high gray level is greater than the number of pixels representing a relatively low gray level.

Therefore, when the first image is displayed on the display panel 110, as shown in FIG. 2A, black portions (pixels emitting light with a relatively low gray level) can be displayed on the display panel 110 greater than white portions (pixels emitting light with a relatively high gray level). Further, when the second image is displayed on the display panel 110, as shown in FIG. 2B, white portions (pixels emitting light with a relatively high gray level) can be displayed on the display panel 110 greater than black portions (pixels emitting light with a relatively low gray level).

Although FIGS. 2A and 2B show that the black and white portions of the first image and the second image are uniformly disposed on the display panel 110; however, embodiments of the present disclosure are not limited thereto. For example, black and white portions of the first image and the second image may not be uniformly arranged on the display panel 110.

Figure 3:
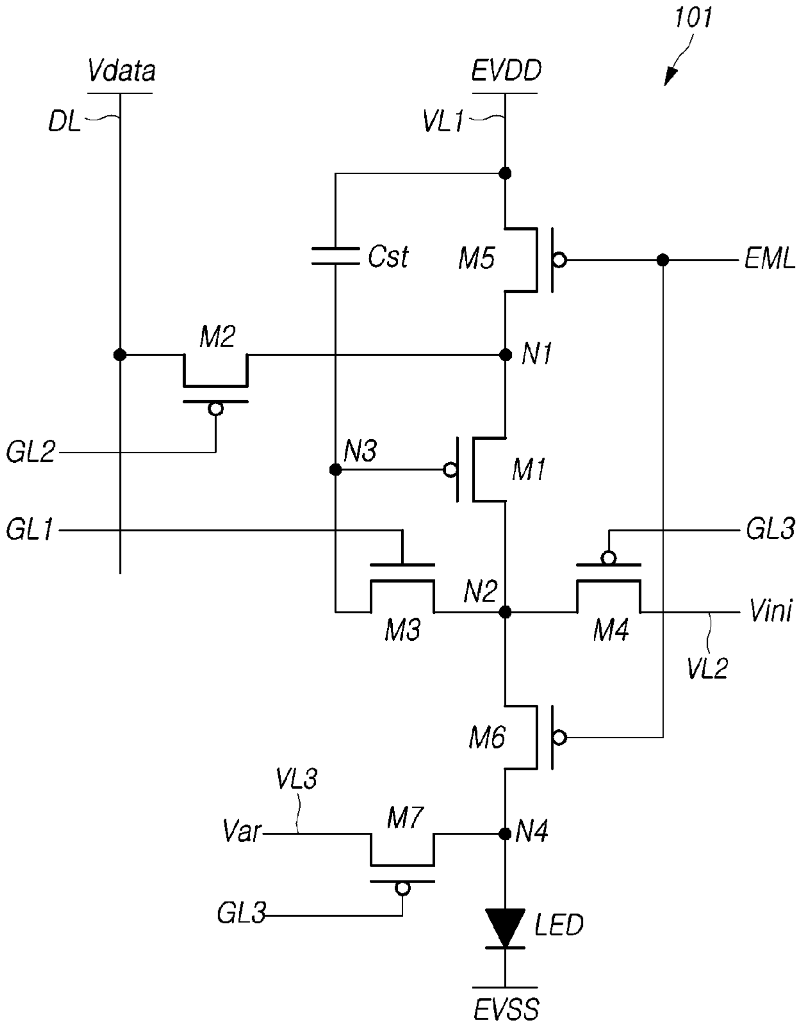
FIG. 3 illustrates an example circuit of a pixel employed in the display device according to embodiments of the present disclosure.
Figure 4:
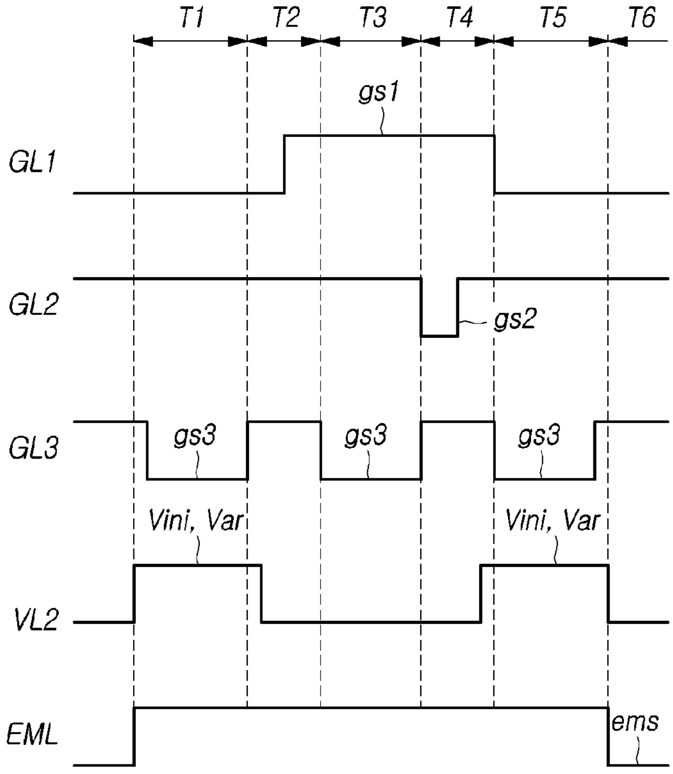
FIG. 4 is a timing diagram illustrating the operation of the pixel illustrated in FIG. 3.

FIG. 3 illustrates an example circuit of a pixel 101 employed in the display device according to embodiments of the present disclosure. FIG. 4 is a timing diagram illustrating the operation of the pixel 101 illustrated in FIG. 3.

Referring to FIGS. 3 and 4, the pixel 101 can include a first transistor M1, a second transistor M2, a third transistor M3, a fourth transistor M4, a fifth transistor M5, a sixth transistor M6, and a seventh transistor M7, a storage capacitor Cst, and a light emitting diode LED. It should be noted that the pixel 101 shown in FIG. 3 is merely one example of pixels that can be employed in the display device 100. Thus, embodiments of the present disclosure are not limited to the pixel 101 shown in FIG. 3.

First and second electrodes of the first transistor M1 can be connected to first and second nodes N1 and N2, respectively. The gate electrode of the first transistor M1 can be connected to a third node N3.

First and second electrodes of the second transistor M2 can be connected to a data line DL and the first node N1, respectively. The gate electrode of the second transistor M2 can be connected to a second gate line GL2.

First and second electrodes of the third transistor M3 can be connected to the second and third nodes N2 and N3, respectively. The gate electrode of the third transistor M3 can be connected to a first gate line GL1.

First and second electrodes of the fourth transistor M4 can be connected to a first initialization signal line VL2 and the second node N2, respectively. The gate electrode of the fourth transistor M4 can be connected to a third gate line GL3.

First and second electrodes of the fifth transistor M5 can be connected to a first power supply line VL1 for transmitting a first power supply voltage EVDD and the first node N1, respectively. The gate electrode of the first transistor M5 can be connected to a light emitting control signal line EML.

First and second electrodes of the sixth transistor M6 can be connected to the second node N2 and a fourth node N4, respectively. The gate electrode of the sixth transistor M6 can be connected to the light emitting control signal line EML.

First and second electrodes of the seventh transistor M7 can be connected to a second initialization signal line VL3 and the fourth node N4, respectively. The gate electrode of the seventh transistor M7 can be connected to the third gate line GL3.

First and second electrodes of the storage capacitor Cst can be connected to the third node N3 and the first power supply line VL1, respectively. The storage capacitor Cst can enable a voltage at the third node N3 to be remained. Further, the storage capacitor Cst can store a voltage corresponding to a threshold voltage of the first transistor M1.

The light emitting diode (LED) can include an anode electrode, a cathode electrode, and an emissive layer disposed between the anode electrode and the cathode electrode. The emissive layer can be an organic layer or an inorganic layer. The anode electrode of the light emitting diode LED can be connected to the fourth node N4, and the cathode electrode can be connected to a second power supply voltage (or a second power supply supplying the second power supply voltage) EVSS having a lower voltage level than the first power supply voltage EVDD.

The pixel 101 implemented as described above can operate as follows.

In a first period T1, a third gate signal gs3 having a low level can be transmitted through the third gate line GL3. The fourth transistor M4 and the seventh transistor M7 can be turned on by the third gate signal gs3. When the fourth transistor M4 and the seventh transistor M7 are turned on, a first initialization signal Vini and a second initialization signal Var, which have a voltage of a high level, are applied to the second node N2 and the fourth node N4, respectively, and thus, the second node N2 and the fourth node N4 can be initialized by the first initialization signal Vini and the second initialization signal Var, respectively. The first initialization signal Vini and the second initialization signal Var can be the same signal. However, embodiments of the present disclosure are not limited thereto.

Although the third gate signal gs3 having the low level is shown in the first period T1, however, embodiments of the present disclosure are not limited thereto. For example, since the fourth transistor M4 and the seventh transistor M7 are P-type MOS transistors as shown in FIG. 3, the third gate signal gs3 can have the low level; however, if the fourth transistor M4 and the seventh transistor M7 are N-type MOS transistors, the third gate signal gs3 can have a high level.

In a second period T2, the third gate signal gs3 can be changed from the low level to a high level and thus, the third gate signal gs3 having the low level cannot be transmitted. As the third gate signal gs3 having the low level is not transmitted, the first initialization signal Vini and the second initialization signal Var cannot be applied to the second node N2 and the fourth node N4, respectively. Further, in the second period T2, the first initialization signal Vini and the second initialization signal Var can be changed from the high level to a low level. In the second period T2, the first gate signal gs1 having a high level can be transmitted. When the first gate signal gs1 having the high level is transmitted, the third transistor M3 can be turned on. When the third transistor M1 is turned on, the third transistor M3 can be diode-connected.

In a first period T3, the third gate signal gs3 having the low level can be transmitted through the third gate line GL3. In this time, the first initialization signal Vini and the second initialization signal Var having the low level can be transmitted. When the third gate signal gs having the low level is transmitted, as the fourth transistor M4 and the seventh transistor M7 are turned on, and the second node N2 and the fourth node N4 are initialized by the first initialization signal Vini and the second initialization signal Var having a voltage of the low level, respective voltage levels at the second node N2 and the fourth node N4 can be lowered, and thus, a driving current can be prevented from flowing to the light emitting diode LED.

Further, in the third period T3, as the first gate signal gs1 having the high level is transmitted through the first gate line GL1, the third transistor M3 can remain turned on. When the third transistor M3 is in the turn-on state, the first transistor M1 can be diode-connected, and the threshold voltage of the first transistor M1 can be stored in the storage capacitor Cst.

In a fourth period T4, the first gate signal gs1 transmitted through the first gate line GL1 remains at the high level, and a second gate signal gs2 having a low level can be transmitted through the second gate line GL2. In FIG. 3, since a P-type MOS transistor is used as the second transistor M2, the second gate signal gs2 can have the low level to turn on the second transistor M2. In this case, if an N-type MOS transistor is used as the second transistor M2, the second gate signal gs2 can have a high level. The second transistor M2 and the third transistor M3 can be turned on by the first gate signal gs1 and the second gate signal gs2, respectively.

In the fourth period T4, the third gate signal gs3 having the low level cannot be transmitted. Accordingly, the second transistor M2 and the third transistor M3 can be turned on, and the fourth transistor M4 and the seventh transistor M7 can be turned off.

When the second transistor M2 is turned on, a data voltage Vdata corresponding to a data signal can be transmitted to the first node N1. In this case, since the third transistor M3 is in the turn-on state, the data voltage Vdata can be transmitted to the storage capacitor Cst. Accordingly, a voltage corresponding to the threshold voltage of the first transistor M1 and the data voltage Vdata can be stored in the storage capacitor Cst.

As the second gate signal gs2 is changed from the low level to a high level, thus, the second gate signal gs2 having the low level is not transmitted through the second gate line GL2, and thereafter, in a fifth period T5, the first gate signal gs1 having the high level cannot be transmitted. When the second gate signal gs2 having the high level is not transmitted, the second transistor M2 can be turned off, and thus, the data voltage Vdata cannot be transmitted to the first node N1. When the first gate signal gs1 having the high level is not transmitted, the third transistor M3 can be turned off.

In the fifth period T5, the third gate signal gs3 having the low level can be transmitted. The fourth transistor M4 and the seventh transistor M7 can be turned on by the third gate signal gs3, and the first initialization signal Vini and the second initialization signal Var having the high level can be transmitted. As the first initialization signal Vini and the second initialization signal Var having the high level can be applied to the second node N2 and the fourth node N4 by the fourth transistor M4 and the seventh transistor M7, respectively, therefore, the second node N2 and the fourth node N4 can be initialized.

In a sixth period T6, as the third gate signal gs3 having the low level is not transmitted, therefore, the fourth transistor M4 and the seventh transistor M7 can be turned off. A light emitting control signal ems having a low level can be transmitted through the light emitting control signal line EML. Since the fifth transistor M5 and the sixth transistor M6 are P-type MOS transistors, the light emitting control signal ems having the low level can be transmitted to turn on the fifth transistor M5 and the sixth transistor M6. If the fifth transistor M5 and the sixth transistor M6 are N-type MOS transistors, the light emitting control signal ems having a high level can be transmitted to turn on the fifth transistor M5 and the sixth transistor M6. When the light emitting control signal ems is transmitted, the fifth transistor M5 and the sixth transistor M6 can be turned on, and at this time, since a voltage corresponding to the threshold voltage of the first transistor M1 and the data voltage Vdata is stored in the storage capacitor Cst, a driving current transmitted to the light emitting diode LED by the first transistor M1 can be compensated for the threshold voltage.

Figure 5A:
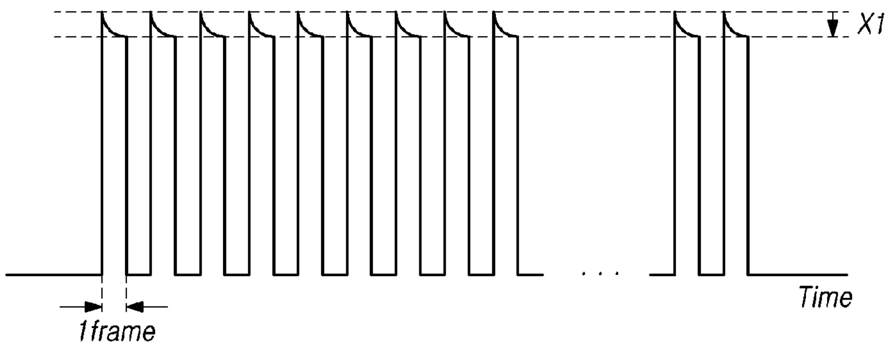
FIGS. 5A and 5B illustrate changes in luminance for each driving frequency in the display device according to embodiments of the present disclosure.
Figure 5B:
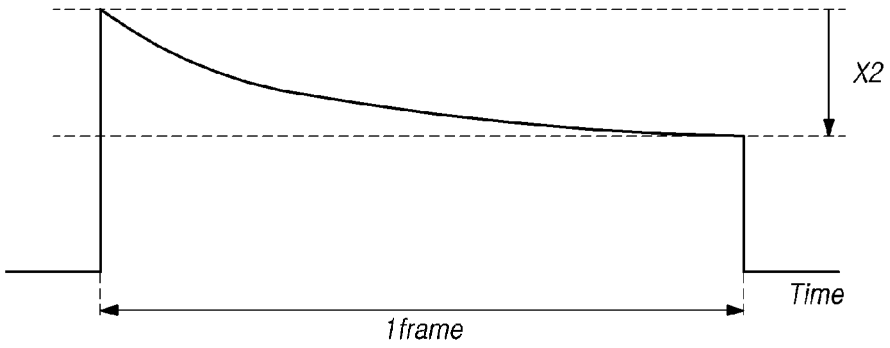
Figure 6:
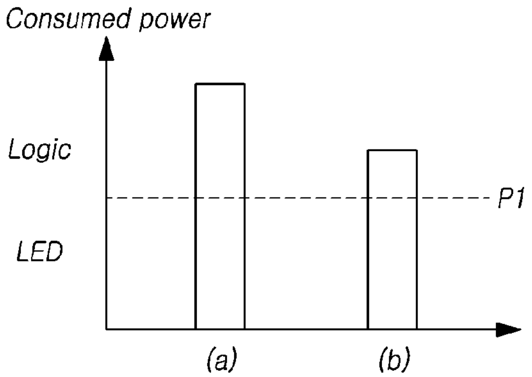
FIG. 6 is a graph illustrating power consumption in the display device for each driving frequency.

FIGS. 5A and 5B illustrate changes in luminance for each driving frequency in the display device according to embodiments of the present disclosure. FIG. 6 is a graph illustrating power consumption in the display device for each driving frequency.

FIG. 5A shows a change in luminance of the display device 100 in a second mode, which is a normal driving mode. FIG. 5B shows a change in luminance of the display device 100 in a first mode in which the display device 100 is driven to consume less power compared to the second mode. A driving frequency in the second mode is set to be greater than that in the first mode. For example, a driving frequency in the first mode can be 1 Hz, and a driving frequency in the second mode can be 120 Hz. However, embodiments of the present disclosure are not limited to these driving frequencies.

In the pixel 101, a driving current relative to a voltage stored in the storage capacitor Cst can flow to the light emitting diode LED, and the voltage stored in the storage capacitor Cst can be lowered due to leakage current, etc., thus, resulting in the luminance of the display panel 110 being degraded. When a driving frequency is 120 Hz as shown in FIG. 5A, since the time of one frame is relatively short, and the frequency of accumulating electric charge to the storage capacitor Cst is relatively high, a time taken for a degradation in luminance X1 to be developed in one frame can become shortened, and thus, the luminance degradation X1 can be small.

In contrast, when a driving frequency is 1 Hz as shown in FIG. 5B, since the time of one frame is relatively long, and the frequency of accumulating electric charge to the storage capacitor Cst is relatively low, a time taken for a degradation in luminance X2 to be developed in one frame can become lengthened, and thus, the luminance degradation X2 can be greater than the luminance degradation X1 in the case of the driving frequency of 120 Hz.

FIG. 6 shows a comparison of power consumption of the display device 100 in the first mode and the second mode, where (a) is the second mode and (b) is the first mode. Power consumed in the display device 100 can include power consumed by a light emitting diode LED, and power consumed by the data driver 120, the gate driver 130, and/or the controller 140, which include logic elements Logic and are configured to supply a driving current to the light emitting diode LED.

When the display device 100 expresses the same gray level in the first mode and the second mode, since the amount of driving current supplied to the light emitting diode LED is the same, the amount of power consumed by the light emitting diode LED can be the same as shown in portions located under a dotted line P1. However, as shown in portions located over the dotted line P1, since the logic elements Logic can operate differently depending on driving frequencies, therefore, the amount of power consumed by the display device 100 in the first mode can be smaller than the amount of power consumed by the display device 100 in the second mode.

Figure 7:
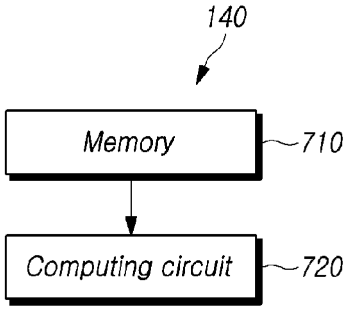
FIG. 7 illustrates an example of a timing controller illustrated in FIG. 1.

FIG. 7 illustrates an example of the timing controller illustrated in FIG. 1.

Referring to FIG. 7, the timing controller 140 can add image signals included in each frame among a plurality of frames, and compare a value resulting from the adding with a first threshold value or a second threshold value. By comparing the value obtained by adding the image signals with a preset value, it can be determined that the number of pixels representing a low gray level among pixels included in the one frame is equal to or greater than the first threshold value or that the number of pixels representing a high gray level among the pixels included in the one frame is equal to or greater than the second threshold value.

By comparing the value from the adding with the preset value, when the value from the adding is less than the first threshold value, the timing controller 140 can determine that the frame in which the image signals are added is included in the first image, and when the value from the adding is greater than the second threshold value, the timing controller

140 can determine that the frame in which the image signals are added is included the second image.

However, the present disclosure is not limited to the above. For example, the timing controller 140 can also compare a value resulting from the adding with the preset value. The display panel 110 operates in the first mode if the value resulting from the adding is equal to or greater than the preset value, and the display panel 110 operates in the second mode if the value resulting from the adding is less than the preset value.

The timing controller 140 can receive an image signal from an external device, and the received image signal can be a digital signal.

The timing controller 140 can include a memory 710. The memory 710 can store image signals on a frame basis in an image including a plurality of frames. The memory 710 can store the first threshold value and the second threshold value.

The timing controller 140 can include a computing circuit 720 capable of adding the image signals of one frame stored in the memory 710 and comparing a value resulting from the adding with the first threshold value or the second threshold value.

Figure 8:
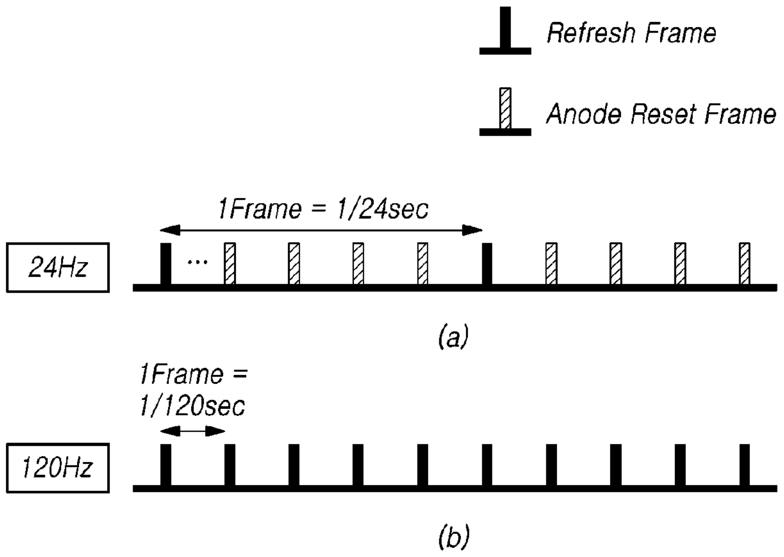
FIG. 8 illustrates examples of a first mode and a second mode defined in the display device according to embodiments of the present disclosure.

FIG. 8 illustrates examples of the first mode and the second mode defined in the display device according to embodiments of the present disclosure.

Referring to FIG. 8, in the first mode (a), a refresh frame can be repeated at a first driving frequency, and one or more reset frames are provided between one refresh frame and a next refresh frame.

The refresh frame means a frame newly (i.e., repeatedly) transmitted for each frame to the gate electrode of the first transistor M1 of the pixel 101 shown in FIG. 3, and the reset frame means a frame for resetting a voltage at the anode electrode of the light emitting diode LED included in the pixel 101 shown in FIG. 3.

In the refresh frame, a data signal can be transmitted through the data line, and in the reset frame, a data signal cannot be transmitted through the data line and a voltage at the anode electrode can be reset. Here, the resetting of the voltage at the anode electrode can mean that the voltage at the anode electrode of the light emitting diode LED is initialized by the second initialization signal Var shown in FIGS. 3 and 4.

In the second mode (b), the refresh frame can be repeated at a second driving frequency. In the second mode (b), a reset frame cannot be provided.

In the refresh frame, the data driver 120 can supply data signals to the display panel 110. In the second mode (b), as the refresh frame is repeated for a short time, it is possible to prevent the reduction of a voltage charged in the storage capacitor Cst shown in FIG. 3.

Although FIG. 8 shows that the first driving frequency in the first mode (a) is 24 Hz and the second driving frequency in the second mode (b) is 120 Hz, this is merely one example of a particular implementation, and the first driving frequency and the second driving frequency according to embodiments of the present disclosure are not limited thereto.

Further, in the first mode (a), the refresh frame and the reset frame can be repeated based on the second driving frequency. For example, the number of refresh frames and the number of reset frames in a preset period in the first mode (a) can be the same as the number of refresh frames in the preset period in the second mode (b). However, embodiments of the present disclosure are not limited thereto.

Figure 9:
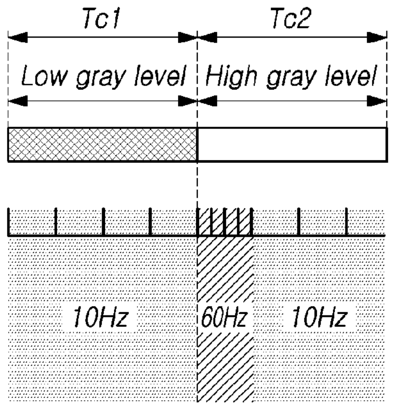
FIG. 9 illustrates a method of driving the display device according to embodiments of the present disclosure.

FIG. 9 illustrates a method of driving the display device according to embodiments of the present disclosure.

Referring to FIG. 9, in a first period Tc1, the display device 100 can display a first image. For example, in the first period Tc1, the display device 100 can be driven in a situation where among a plurality of pixels 101, the number of pixels representing a low gray level is equal to or greater than a first threshold.

In a second period Tc2, the display device 100 can display a second image. For example, in the second period Tc2, the display device 100 can be driven in a situation where among a plurality of pixels 101, the number of pixels representing a high gray level is equal to or greater than a second threshold.

The first period Tc1 and the second period Tc2 can be driven in the first mode in which the display device 100 is driven to operate with low power consumption.

In this situation, when an image displayed on the display device 100 is changed from the first image to the second image in the second period Tc2, some of a plurality of frames included in the second image can be operated at a second driving frequency based on the second mode in which the display device 100 is driven in the normal mode. Further, after a preset time passes, the second image can be operated based on the first driving frequency.

For example, each of the plurality of pixels can include a light emitting diode including an anode electrode, a cathode electrode, and an emissive layer disposed between the anode electrode and the cathode electrode.

In the first mode (a), the second image can include reset frames for periodically resetting the voltage of the anode electrode between refresh frames for supplying at least one data signal to at least one of the plurality of pixels through at least one data line for a preset time.

For example, in the second period Tc2, at least some of the plurality of frames included in the second image can include refresh frames for supplying at least one data signal to at least one of the plurality of pixels through at least one data line, and one or more reset frames for periodically resetting the voltage of the anode electrode between the refresh frames. In addition, the remaining frames of the plurality of frames included in the second image can include one or more refresh frames for supplying at least one data signal to at least one data line.

Although FIG. 9 shows that the first driving frequency is 10 Hz and the second driving frequency is 60 Hz, however, embodiments of the present disclosure are not limited thereto.

Figure 10A:
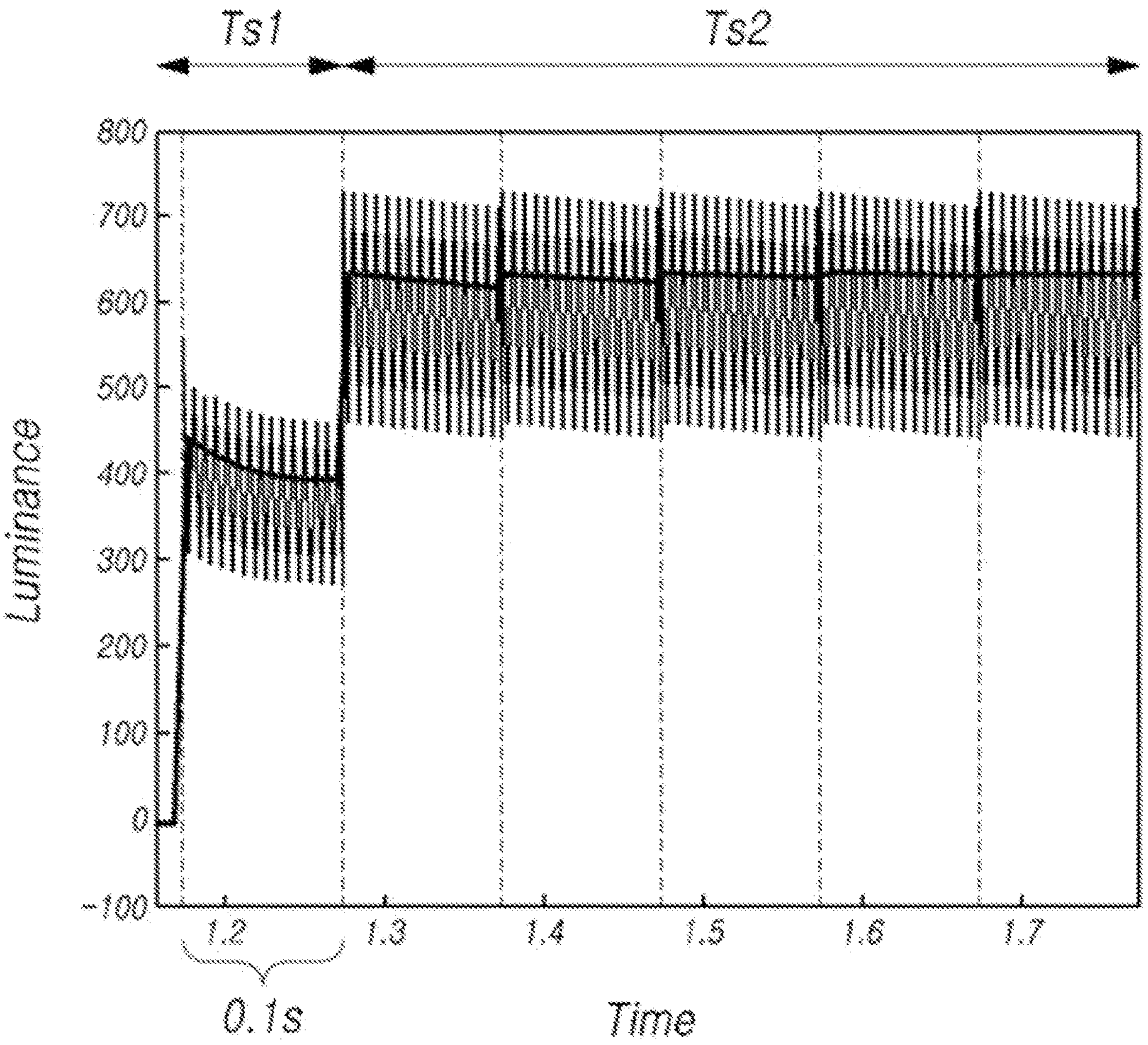
FIG. 10A is a graph illustrating a change in luminance for each frame in a typical display device.
Figure 10B:
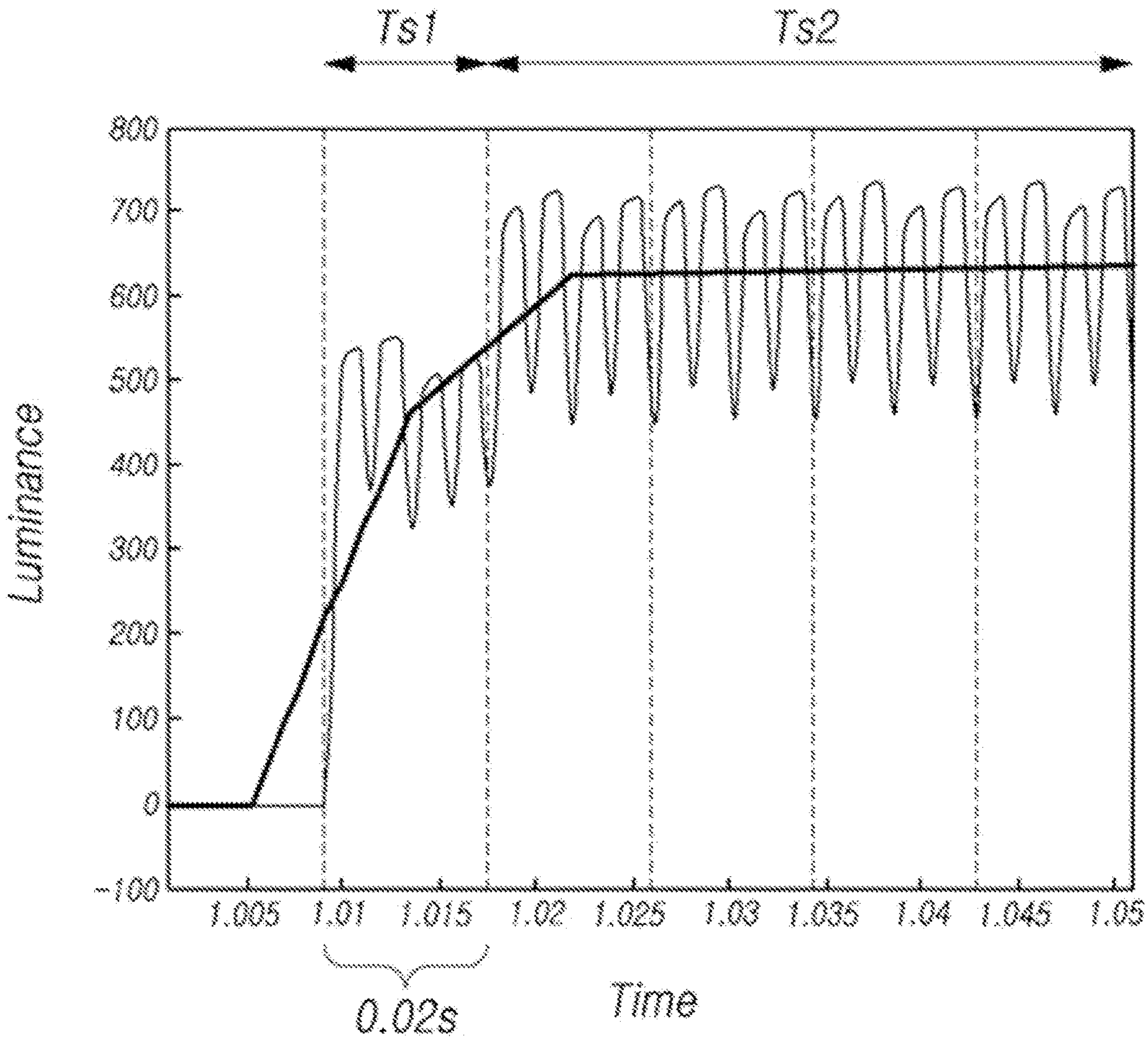
FIG. 10B is a graph illustrating, in comparison, a change in luminance for each frame in the display device according to embodiments of the present disclosure.

FIG. 10A is a graph illustrating a change in luminance for each frame in a typical display device, and in comparison, FIG. 10B is a graph illustrating a change in luminance for each frame in the display device according to embodiments of the present disclosure.

FIGS. 10A and 10B show changes in luminance displayed on the display device 100, and lines represent average luminance. In FIGS. 10A and 10B, it can be seen that luminance of the display device 100 is low before the first period Ts1, and the luminance increases after the first period Ts1. In this case, the first period Ts1 refers to a time taken when the displaying of the display device 100 is changed as representing a low gray level to representing a high gray level. Further, the second time Ts2 refers to a time period after reaching the target luminance.

Referring to FIG. 10A, it can be seen that the first time Ts1 takes 0.1 second, and referring to FIG. 10B, it can be seen that the first time Ts1 takes 0.02 seconds. For example, it can be seen that the time taken to reach the target luminance in the case of FIG. 10B becomes shorter, comparing with that in the case of FIG. 10A.

Figure 11:
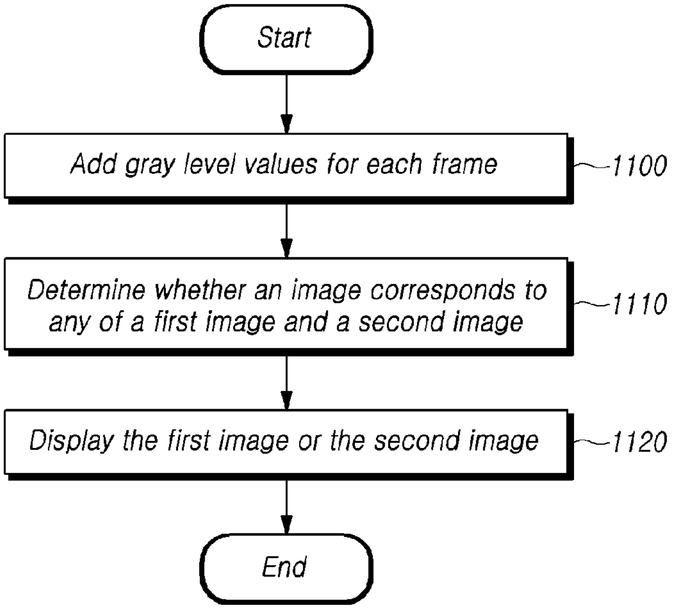
FIG. 11 is a flow diagram of a method of driving the display device according to embodiments of the present disclosure.

FIG. 11 is a flow diagram of a method of driving the display device 100 according to embodiments of the present disclosure.

Referring to FIG. 11, the method of driving the display device 100 according to embodiments of the present disclosure includes: a step 1100 of adding gray level values on a frame basis for an image including a plurality of frames, a step 1110 of determining whether the image corresponds to a first image representing a low gray level or a second image representing a high gray level based on a value resulting from the adding, and a step 1120 of displaying the first image on a display panel 110 based on a first driving frequency, and/or displaying the second image on the display panel 110 based on a second driving frequency higher than the first driving frequency for a preset time and thereafter displaying the second image on the display panel 110 based on the first driving frequency.

The display device 100 includes the display panel 110 on which a plurality of data lines and a plurality of gate lines are disposed and includes a plurality of pixels. The display device 100 can operate in a first mode and a second mode, which are distinct from each other. The first mode refers to a low power mode in which the display device 100 is driven to consume less power, and the second mode refers to a normal mode in which the display device 100 is driven to typically operate. In the first mode, the display device 100 can be driven at a lower frequency to reduce power consumption compared with the second mode. For example, in general, in the first mode, the display device 100 can be driven at the first driving frequency, and in the second mode, the display device 100 can be driven at the second driving frequency higher than the first driving frequency.

However, when the displaying of the display device 100 driven in the first mode is changed from the first image representing a low gray level to the second image representing a high gray level, at a time when the displaying of the display device 100 is changed to the second image, the display device 100 displaying the second image for a preset time can be driven at a frequency higher than the first driving frequency. Further, at a time when the displaying of the display device 100 is changed to the second image, the display device 100 displaying the second image for a preset time can be driven at the second driving frequency.

Each of the plurality of pixels can include a light emitting diode including an anode electrode, a cathode electrode, and an emissive layer disposed between the anode electrode and the cathode electrode.

The display device 100 can add image signals included in each of a plurality of frames, and determine whether the image displayed on the display panel 110 corresponds to the first image or the second image.

Some of a plurality of frames included in the second image can include refresh frames for supplying at least one data signal to at least one data line, and one or more reset frames for periodically resetting a voltage at the anode electrode, which are located between the refresh frames, and the others of the plurality of frames included in the second image can include one or more refresh frames for supplying at least one data signal to at least one data line.

The above description has been presented to enable any person skilled in the art to make and use the invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. Although the exemplary embodiments have been described for illustrative purposes, a person skilled in the art will appreciate that various modifications and applications are possible without departing from the essential characteristics of the present disclosure. For example, the specific components of the exemplary embodiments can be variously modified. The above description and the accompanying drawings provide an example of the technical idea of the present invention for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure is to be construed according to the claims, and all technical ideas within the scope of the claims should be interpreted as being included in the scope of the present invention.

What is claimed is:

1. A display device comprising:

a display panel including a plurality of data lines, a plurality of gate lines, and a plurality of pixels, and configured to display images including a plurality of frames, each of the plurality of pixels including a light emitting diode including an anode electrode, a cathode electrode, and an emissive layer disposed between the anode electrode and the cathode electrode, wherein the display panel operates in a first mode for displaying at least a first image including a plurality of first frames among the plurality of frames based on a first driving frequency, or in a second mode for displaying a second image including a plurality of second frames among the plurality of frames based on a second driving frequency different from the first driving frequency, wherein when the first image displayed on the display panel operating in the first mode is changed to a third image, at least one frame of a plurality of third frames running after the first image has been displayed among the plurality of frames displaying the third image operates at the second driving frequency based on the second mode, and wherein in the first mode, the second image includes reset frames for periodically resetting a voltage of the anode electrode between refresh frames for supplying at least one data signal to at least one of the plurality of pixels for a preset time.

2. The display device according to claim 1, wherein the second driving frequency is higher than the first driving frequency.

3. The display device according to claim 1, wherein remaining frames except for the at least one frame among the plurality of third frames included in the third image are configured with refresh frames.

4. The display device according to claim 1, wherein in the first mode, during a period where the third image is displayed on the display panel, two or more frames including the at least one frame among the plurality of third frames included in the third image operates at the second driving frequency, and one or more frames among remaining frames except for the two or more frames operates at the first driving frequency.

5. The display device according to claim 4, wherein in the first mode, when after the at least one frame operating at the second driving frequency based on the second mode, a preset time passes, the third image is displayed based on the first driving frequency.

6. The display device according to claim 1, wherein in the first image, a number of pixels representing a low gray level among the plurality of pixels is equal to or greater than a first threshold value, and in the third image, a number of pixels representing a high gray level among the plurality of pixels is equal to or greater than a second threshold value.

7. The display device according to claim 1, further comprising:

a data driver configured to supply data signals to the plurality of data lines;

a gate driver configured to supply gate signals to the plurality of gate lines; and a timing controller configured to control the data driver and the gate driver and including a memory configured to store image signals on a frame basis, wherein the timing controller adds image signals included in one frame among the plurality of frames stored in the memory.

8. The display device according to claim 7, wherein, by comparing a value resulting from the adding with a preset value, the time controller determines that a number of pixels representing a low gray level among pixels included in the one frame is equal to or greater than a first threshold value or determines that a number of pixels representing a high gray level among the pixels included in the one frame is equal to or greater than a second threshold value.

9. The display device according to claim 1, wherein the second mode includes refresh frames for supplying the at least one data signal to the at least one of the plurality of data lines.

10. A display device comprising:

a display panel including a plurality of data lines, a plurality of gate lines, and a plurality of pixels connected to the plurality of data lines and the plurality of gate lines, and configured to display images including a plurality of frames; and a timing controller, wherein when a corresponding image among the images displayed on the display panel is changed from a first image representing a low gray level to a second image representing a high gray level, the first image is displayed based on a first driving frequency, and the second image is displayed based on a second driving frequency different from the first driving frequency for a preset time and thereafter is displayed based on the first driving frequency, and wherein the timing controller determines whether the image displayed on the display panel corresponds to the first image or the second image based on image signals included in one frame of the plurality of frames.

11. The display device according to claim 10, wherein the second driving frequency is higher than the first driving frequency.

12. The display device according to claim 10, wherein the data driver, the gate driver, and the timing controller operate at the first driving frequency or the second driving frequency for the first image or the second image.

13. The display device according to claim 10, wherein each of the plurality of pixels includes a light emitting diode including an anode electrode, a cathode electrode, and an emissive layer disposed between the anode electrode and the cathode electrode, and wherein the second image includes refresh frames for supplying at least one data signal to at least one of the plurality of pixels for a preset time, and at least one reset frame for periodically resetting a voltage of an anode electrode between the refresh frames.

14. The display device according to claim 10, wherein each of the plurality of pixels includes a light emitting diode including an anode electrode, a cathode electrode, and an emissive layer disposed between the anode electrode and the cathode electrode, and wherein some of frames included in the second image among the plurality of frames include refresh frames for supplying at least one data signal to at least one of the plurality of pixels through at least one of the plurality of data lines, and one or more reset frames for periodically resetting a voltage at the anode electrode, which are located between the refresh frames, and the others of the frames included in the second image include refresh frames for supplying the at least one data signal to the at least one of the plurality of data lines.

15. The display device according to claim 14, wherein the some of the pixels included in the second image are displayed on the display panel based on the second driving frequency, and the others of the frames included in the second image are displayed on the display panel based on the first driving frequency.

16. The display device according to claim 14, wherein frames included in the first image among the plurality of frames are displayed on the display panel based on the first driving frequency.

17. A method of driving a display device including a display panel, the method comprising:

computing gray level values on a frame basis for an image including a plurality of frames; and determining whether the image corresponds to a first image representing a low gray level or a second image representing a high gray level based on a value resulting from the computing, wherein the first image is displayed on the display panel based on a first driving frequency, and the second image is displayed on the display panel based on a second driving frequency higher than the first driving frequency for a preset time and thereafter is displayed based on the first driving frequency.

18. The method according to claim 17, wherein the second driving frequency is higher than the first driving frequency.

19. The method according to claim 17, wherein the display panel including a plurality of data lines, a plurality of gate lines, and a plurality of pixels operates in a first mode and a second mode, which are distinct from each other, and wherein the second image in the first mode is displayed on the display panel based on the second driving frequency higher than the first driving frequency for a preset time and thereafter is displayed on the display panel based on the first driving frequency.

20. The method according to claim 19, wherein each of the plurality of pixels includes a light emitting diode including an anode electrode, a cathode electrode, and an emissive layer disposed between the anode electrode and the cathode electrode, and wherein some of a plurality of frames included in the second image include refresh frames for supplying at least one data signal to at least one of the plurality of data lines, and one or more reset frames for periodically resetting a voltage at the anode electrode, which are located between the refresh frames, and the others of the plurality of frames included in the second image include one or more refresh frames for supplying the at least one data signal to the at least one of the plurality of data lines.

* * * * *